United States Patent [19]
Watson

[11] 3,878,118
[45] Apr. 15, 1975

[54] SELF-HEATING CHEMICAL COMPOSITIONS

[75] Inventor: Hugh R. Watson, Wargrave, England

[73] Assignee: Wilkinson Sword Limited, London, England

[22] Filed: June 30, 1972

[21] Appl. No.: 268,019

Related U.S. Application Data

[63] Continuation-in-part of Ser. No. 855,395, Sept. 4, 1969, abandoned.

[30] Foreign Application Priority Data

Sept. 6, 1968 United Kingdom............... 42458/68

[52] U.S. Cl. ............. 252/90; 252/90 H; 252/188.3; 424/70; 44/3; 206/84; 252/307; 252/92; 126/263
[51] Int. Cl............................................ C11d 3/20
[58] Field of Search .......... 252/90, 188.3, 182, 105, 252/92, 307; 424/70, 73; 260/526; 44/3; 206/84; 126/263

[56] References Cited
UNITED STATES PATENTS

3,341,418   9/1967   Moses et al.......................... 252/90

OTHER PUBLICATIONS

Noller–Chem. of Organic Cpd., 1965, W. B. Saunders, p. 893–894.

*Primary Examiner*—William E. Schulz
*Attorney, Agent, or Firm*—Wolfe, Hubbard, Leydig, Voit & Osann, Ltd.

[57] ABSTRACT

Self-heating systems for use in producing heated compositions for example cosmetic compositions, such as shaving creams, comprising an oxidant part and a reductant part, wherein the reductant is a substituted glyoxylic acid or a salt thereof.

11 Claims, No Drawings

SELF-HEATING CHEMICAL COMPOSITIONS

This is a continuation-in-part of application No. 855,395 filed Sept. 4, 1969 and now abandoned.

BACKGROUND OF THE INVENTION

1. Field of the Invention

This invention relates to so-called "self-heating" systems. Such systems have two components which are mixed when heating of the system is desired, for example to produce a heated composition, one component comprising an oxidant and the other a reductant such that sufficient heat is evolved by reaction therebetween to produce the required rise in temperature of the system.

2. Description of the Prior Art

Self-heating systems including an oxidant and a reductant have been proposed in U.S. Pat. No. 3,341,418. In these proposed systems, hydrogen peroxide or urea hydrogen peroxide is used as an oxidant with thiourea or certain substituted thioureas (thiobarbituric acids) as reductants to form heated shaving compositions.

Although shaving compositions of the desired temperatures can be produced from the self-heating systems of U.S. Pat. No. 3,341,418, they do suffer with a number of disadvantages. One major disadvantage with these systems is that sulfate ions are generally produced by the reaction of the oxidant with the reductant. Despite the fact that the oxidant and reductant are stored separately before mixing to form a heated composition, traces of heated composition can remain in contact with the package from which it is dispensed after dispensing the composition and thereby cause corrosion. This can be a particularly serious problem with tinplate aerosol containers used to dispense heated foams. Sulfate ions can also result in corrosion not only of the aerosol container itself but of the valve mechanism used for dispensing the foam and this may result in malfunctioning of the container.

A further disadvantage with the hitherto proposed systems is that they generally require the use of a catalyst.

It is therefore an object of the present invention to provide improved self-heating systems.

It is a further object of the invention to provide self-heating systems using an oxidant and a reductant which do not produce sulfate ions in the reaction therebetween.

It is a still further object of the invention to provide self-heating systems in which a catalyst is not required.

Other and further objects will be apparent from the description which follows.

SUMMARY OF THE INVENTION

According to the present invention there is provided a self-heating system comprising an oxidant selected from the group consisting of hydrogen peroxide and complexes thereof with urea, and a reductant selected from the group consisting of substituted glyoxylic acids and salts thereof.

DESCRIPTION OF PREFERRED EMBODIMENTS

The systems of the present invention can be used for producing a variety of heated compositions. Heated cosmetic compositions, for example heated shaving compositions, hot facial cleansers and heated shampoos can be produced from systems of the present invention, heated shaving compositions being a particularly preferred application. However, the systems of the present invention may be used to produce other forms of heated composition, for example heated windscreen deicer compositions. In each case, the appropriate conventional ingredients will be selected in order to produce the desired form of composition, as will be clear to those skilled in the art.

The systems may be stored in any convenient form whereby the oxidant and reductant are separated until a heated composition is required and two-compartment aerosol containers have been found suitable for packaging the systems.

By using a substituted glyoxylic acid or a salt thereof as a reductant, the formation of sulfate ions can be avoided. Furthermore, the stoichiometry of the reaction generally requires one mole of oxidant per mole of glyoxylic acid groups or glyoxylic acid salt groups.

The oxidant and reductant are both conveniently aqueous during storage. However, it may be convenient or desired in certain instances to store, for example the urea hydrogen peroxide complex when it is used as oxidant, as a solid.

The reaction of the oxidant with the reductant should generally be effected in an aqueous system at a pH of at least 7.0 and preferably at a pH of from 8.0 to 10.5. Since hydrogen peroxide is generally unstable in aqueous alkaline solutions, the oxidant should generally be stored at lower pH than is desired for the conditions of reaction with the reductant, as will be clear to those skilled in the art. Simple tests are all that are required to establish the pH required for the aqueous system in which the reductant is stored, having regard to such factors as the pH of the aqueous system in which the oxidant is stored and the ratio of mixing of the systems containing the oxidant and reductant when a heated composition is to be formed.

In general, the nature of the substitutent in the substituted glyoxylic acids and salts thereof is unimportant provided the desired temperature rise can be obtained in the resulting compositions. The desired temperature rise will depend, for example, on the intended use of the compositions produced from the self-heating systems. For the majority of applications, a temperature rise of from 20° to 35° or 40°C is sufficient and usually such a temperature rise will be required within a period of up to 30 seconds to 3 minutes, the time not being in any way critical except that too slow a generation of heat may result in failure to reach the desired temperature due to thermal losses. Simple tests can be used to establish the temperature rise which can be obtained using a particular reductant in a self-heating system.

The substituents in the substituted glyoxylic acids and salts thereof can be aliphatic or aromatic. Suitable aliphatic substituents include alkyl groups, for example lower alkyl groups such as methyl, ethyl and propyl groups.

Aromatic substituents which may be present may be carbocyclic or heterocyclic. Examples of carbocyclic aromatic substituents which may be used include phenyl and naphthyl groups. Examples of heterocyclic substituents which may be used include furyl and thienyl groups. The aromatic substituents may, if desired, be substituted by one or more substituents, for example halo, e.g. chloro or bromo, hydroxy, primary amino, lower ($C_{1-4}$) alkoxy e.g. methoxy, ethoxy or propoxy, lower ($C_{1-4}$) alkyl e.g. methyl, ethyl or propyl, carboxy, carboxycarbonyl, methylenedioxy, phenyl, substituted benzyl and substituted phenoxy substituents. Examples of substituted benzyl substituents include carboxycarbonylbenzyl groups, and examples of substituted phenoxy substituents include carboxycarbonylphenoxy groups.

Compounds which may be used as reductants either in the form of the free acids or salts thereof may be selected, for example, from pyruvic acid, 2-oxobutyric acid, 2-oxovaleric acid, benzoyl formic acid, 2-chlorobenzoyl formic acid, 3-chlorobenzoyl formic acid, 4-chlorobenzoyl formic acid, 2-bromobenzoyl formic acid, 3-bromobenzoyl formic acid, 4-bromobenzoyl formic acid, 2-hydroxybenzoyl formic acid, 4-hydroxybenzoyl formic acid, 2-aminobenzoyl formic acid, 4-aminobenzoyl formic acid, 4-ethylbenzoyl formic acid, 4-t-butylbenzoyl formic acid, 2,4,6-trimethylbenzoyl formic acid, 2,5-dihydroxybenzoyl formic acid, 3,4-dihydroxybenzoyl formic acid, 4-methoxybenzoyl formic acid, 2,4-dimethoxybenzoyl formic acid, 2,5-dimethoxybenzoyl formic acid, 2,6-dimethoxybenzoyl formic acid, 3,4-dimethoxybenzoyl formic acid, 3,4,5-trimethoxybenzoyl formic acid, 2-carboxybenzoyl formic acid, 4-carboxybenzoyl formic acid, 4-hydroxy-3-methoxybenzoyl formic acid, 5-chloro-2-methoxybenzoyl formic acid, 3,4-methylenedioxybenzoyl formic acid, 2-carboxycarbonyl-3-hydroxy-4-methoxybenzoyl formic acid, naphth-1-ylglyoxylic acid, naphth-2-ylglyoxylic acid, 2-methoxynaphth-1-ylglyoxylic acid, 4-methoxynaphth-1-ylglyoxylic acid, 5-methoxynaphth-2-ylglyoxylic acid, fur-2-ylglyoxylic acid, fur-3-ylglyoxylic acid, thien-2-ylglyoxylic acid, 4-phenylbenzoyl formic acid, 4-(4-carboxycarbonylbenzyl)benzoyl formic acid and 4-(4-carboxycarbonylphenoxy)benzoyl formic acid. The above-recited substituted glyoxylic acids and salts thereof may be prepared by known methods.

As will be clear to those skilled in the art, the larger the substituent in the substituted glyoxylic acid, the lower will be the molar heat of reaction resulting from oxidising the reductant since the carboxycarbonyl group which gives rise to the heat of reaction, then forms less of the total weight of the reductant. It is therefore preferred to use reductants having relatively low molecular weights and/or more than one carboxycarbonyl group. However, some stability problems may be encountered with storing systems containing, for example aliphatic glyoxylic acids and salts thereof having an α-hydrogen atom. However, the consequent reduction in available reductant on storage can be compensated for by using correspondingly more reductant initially.

Although free substituted glyoxylic acids may be used as reductants in the present invention, they will generally be present in the systems of the present invention as salts thereof due to their generally being stored at a pH of at least 7. In many cases, both the free acid and a salt thereof will be present depending, for example on the pH of the aqueous system and the dissociation constants of the acid and the base from which the salt is derived. Suitable salts which may be used include alkali metal salts e.g., sodium and potassium salts, and ammonium and substituted ammonium salts e.g., trialkanolammonium salts such as triethanolammonium salts.

The reductant is preferably present in aqueous solution advantageously containing from 5 to 15 percent by weight thereof, based on the weight of the solution. However, as previously explained, the precise amount used will depend upon various factors such as the desired temperature rise, the weight of heated composition produced and the chemical nature of the reductant. As was also previously explained, simple tests may be carried out to ascertain the amount of reductant which should be used in any one case.

The oxidant is preferably present in an amount at least sufficient to oxidise the glyoxylic acid groups or the glyoxylic acid salt groups present in the reductant, one mole of oxidant being required in theory for each mole of glyoxylic acid groups or glyoxylic acid salt groups. However, greater or lesser amounts may be used. Typically a range of from 40:60 to 70;30 preferably from 50:50 to 60:40 for the molar ratio of oxidant to glyoxylic acid groups or glyoxylic acid salt groups can be used. It is generally preferred to use an excess of oxidant compared with that required to oxidise the glyoxylic acid groups or glyoxylic acid salt groups to carboxylic acid or carboxylic acid salt groups.

In general, the oxidant will be aqueous and aqueous solutions of hydrogen peroxide are commercially readily available. The oxidant may also be a complex of urea with hydrogen peroxide and this may be convenient since it can be obtained as a solid. A complex of urea and hydrogen peroxide is commercially available containing 33–35 percent by weight of $H_2O_2$. However, the invention is not limited to the use of any particular composition of complex.

Aqueous solutions of the oxidant preferably contain from about 0.8 to about 2.0 percent by weight of available hydrogen peroxide based on the total weight of system leading to a heated composition.

In producing self-heating systems of the present invention, known methods of formulation may be used. The reductants may be formulated, for example as their salts and these may give rise to aqueous systems for storing the reductants having the desired pH. Alternatively, and where the free substituted glyoxylic acids are used in the formulation of the aqueous systems containing the reductants, the desired pH for the aqueous systems containing the reductants can be obtained by known methods, for example using an acid binding agent. Acid binding agents which may be used include, for example, alkali metal hydroxides e.g. sodium hydroxide and potassium hydroxide, and ammonia and free amines. It is often unnecessary to add an acid binding agent when the reductant used to formulate the self-heating system is a salt of a substituted glyoxylic acid, since the desired pH can often be obtained simply by dissolving the salt in water.

The self-heating systems of the present invention can be used to produce heated compositions without the use of catalysts. This is an advantage not only because it avoids the use of a component which the hitherto proposed systems of U.S. Pat. No. 3,341,418 generally require, but it also prevents mixing of the oxidant with a catalyst for its decomposition. This can avoid excess pressures being formed which could result in bursting of a container, for example an aerosol container, used to store the system.

The self-heating systems of the present invention may be formulated using conventional substances according to the particular use to which the compositions are to be put. For example, systems for producing heated shaving compositions may be produced using known surfactants such as soaps and synthetic surfactants, and other conventional ingredients such as perfumes, as will be clear to those skilled in the art. In general, the conventional substances will be stored with the reductant rather than with the oxidant.

In formulating the systems of the present invention containing a soap, although it is possible to use a salt such as an alkali metal e.g., sodium or potassium, or an ammonium or substituted ammonium e.g., trialkanolammonium such as triethanolammonium salt of at least one long chain fatty acid, for example containing from 12 to 20 carbon atoms e.g., stearic acid or lauric acid, as the soap, it is often more convenient to prepare the soap in situ from the appropriate free long chain carboxylic acid and an appropriate base such as an alkali metal hydroxide or carbonate e.g. sodium hydroxide, sodium carbonate, potassium hydroxide or potassium carbonate. Mixtures of reductant, water and soap, generally referred to in the art as concentrates, preferably contain the soap in a total amount of from 4 to 15 percent by weight based on the free fatty acid from which the soap is derived. The amount of base used can be varied within wide limits provided the resulting concentrate has the desired pH, as explained above.

The systems are preferably formulated to provide a heated composition containing from 55 to 90 percent by weight of water.

One particularly preferred form of system includes a pressuring agent or propellant which can enable heated foamed compositions to be produced. Any of the pressuring agents or propellants used in the aerosol art may be used with such systems, for example hydrocarbon propellants or fluorocarbon propellants. Examples of hydrocarbon propellants which may be used include n-butane or isobutane, either alone or in admixture with propane. Examples of fluorocarbon propellants include dichlorodifluoromethane, monochlorotrifluoromethane, dichlorotetrafluoroethane etc. The amount of propellant used will, of course, depend on such factors as the total head space of the container from which the composition is dispensed and the required density of foam. However, from 3.5 to 4.5 percent by weight of a hydrocarbon propellant, or from 7 to 12 percent by weight of a fluorocarbon propellant, based on the total weight of system is usually satisfactory.

The following Examples are given by way of illustration only:-

EXAMPLE 1

A self-heating shaving lather system was produced in a conventional dual compartment aerosol container, one volume of a solution containing an oxidant being placed in an inner bag within the container and four volumes of a concentrate of a reductant being placed in the container around the inner bag. The solution of the oxidant contained 11 percent w/v of hydrogen peroxide and the concentrate containing the reductant contained the following ingredients in weight percent of the total:-

| | |
|---|---|
| stearic acid | 7.55 |
| lauric acid | 0.96 |
| triethanolamine | 21.10 |
| stearamide | 0.96 |

-Continued

| | |
|---|---|
| lauryldiethanolamide | 3.22 |
| pyruvic acid | 6.50 |
| water | 59.71 |

The container was pressurised over the solution of the reductant with either a hydrocarbon propellant (3.5 percent w/v based on total can contents), or a fluorocarbon propellant (10 percent w/v based on total can contents). On operating the valve of the container, a foam having a pH between 8 and 10 was produced which reached a maximum temperature of about 33°C above ambient after about 10 to 15 seconds.

EXAMPLE 2

A self-heating shaving lather system was produced as in Example 1 except that the concentrate of the reductant consisted of the following ingredients in weight percent of the total of the concentrate:-

| | |
|---|---|
| stearic acid | 7.0 |
| lauric acid | 1.0 |
| triethanolamine | 6.0 |
| cetyl alcohol | 0.3 |
| sorbitol | 3.0 |
| sorbitan monostearate | 0.5 |
| polyoxyethylene (containing about 20 ethylene oxide units) sorbitan monostearate | 4.5 |
| potassium hydroxide | 4.0 |
| a water-soluble lanolin derivative "Solan E" (manufactured by Croda Chemicals Ltd., England) | 0.7 |
| sodium carboxymethylcellulose gum (mol. wt. about 20,000) | 0.2 |
| benzoyl formic acid | 8.5 |
| water | 64.3 |

On operating the valve, a foam having a pH between 8 and 10 was obtained which reached a maximum temperature of about 30°C above ambient after about 10 to 15 seconds.

EXAMPLE 3

A self-heating shaving lather system was produced as in Example 1 except that the concentrate containing the reductant consisted of the following ingredients in weight percent of the total concentrate:-

| | |
|---|---|
| diethanolamine | 7.0 |
| potassium hydroxide | 2.0 |
| water | 65.0 |
| isopropanol | 3.0 |
| stearic acid | 15.0 |
| benzoyl formic acid | 8.0 |

On operating the valve, a foam having a pH between 8 and 10 was produced which reached a maximum temperature of about 25° to 30°C above ambient after about 10 seconds.

EXAMPLE 4

A self-heating shaving lather system was produced as in Example 1 except that the concentrate containing the reductant consisted of the following ingredients in weight percent of the total concentrate:-

| | |
|---|---|
| potassium hydroxide | 2.0 |
| 2-amino-2-methylpropan-1-ol | 3.7 |
| triethanolamine | 2.3 |
| isopropanol | 2.3 |
| water | 73.1 |
| stearic acid | 8.6 |
| benzoyl formic acid | 8.0 |

On operating the valve, a foam having a pH between 8 and 10 was produced which reached a maximum temperature of about 25° to 30°C above ambient after about 10 seconds.

EXAMPLE 5

A self-heating shaving lather system was produced as in Example 1 except that the concentrate containing the reductant consisted of the following ingredients in weight percent of the total concentrate:-

| | |
|---|---|
| diethanolamine | 6.3 |
| potassium hydroxide | 2.5 |
| water | 58.0 |
| sodium lauryl sarcosinate | 3.0 |
| sodium carboxymethylcellulose | 0.2 |
| sorbitol | 7.0 |
| stearic acid | 7.0 |
| lauric acid | 2.0 |
| stearamide | 3.0 |
| 4-methoxybenzoyl formic acid | 11.0 |

On operating the valve, a foam having a pH between 8 and 10 was produced which reached a maximum temperature of about 20° to 25°C above ambient after about 40 to 60 seconds.

Further self-heating shaving lather systems can be produced using substituted glyoxylic acids selected from those hereinbefore specifically set forth.

Although the invention has been particularly exemplified by the production of heated shaving lather, it is not intended that the invention should be so limited, the invention being applicable to other self-heating systems, for example for the production of other heated cosmetic compositions e.g., hot facial cleansers and heated shampoos, and various other heated compositions e.g., hot windscreen de-icer compositions.

1. A self-heating system comprising an oxidant selected from the group consisting of hydrogen peroxide and complexes thereof with urea, and a reductant selected from the group consisting of substituted glyoxylic acids and salts thereof, wherein the substituent in the substituted glyoxylic acids and salts thereof is a member selected from the group consisting of substituted and unsubstituted phenyl groups and the molar ratio of oxidant to glyoxylic acid groups or glyoxylic acid salt groups in the reductant is from 40:60 to 70:30.

2. A system according to claim 1, in an aerosol container, the container having a first compartment containing the reductant and a second compartment containing the oxidant, the container being pressurised with a pressuring agent or a propellant.

3. A system according to claim 2, wherein the reductant is present in an aqueous shave foam in said first compartment and the oxidant is present in a separate aqueous phase in said second compartment.

4. A system according to claim 1, wherein the phenyl groups are substituted by at least one substituent selected from the group consisting of halo, hydroxy, primary amino, lower ($C_{1-4}$) alkyl, lower ($C_{1-4}$) alkoxy, carboxy, carboxycarbonyl, methylenedioxy, phenyl, substituted benzyl and substituted phenoxy.

5. A system according to claim 4, wherein the substituted benzyl substituent is carboxycarbonylbenzyl.

6. A system according to claim 4, wherein the substituted phenoxy substituent is carboxycarbonylphenoxy.

7. A system according to claim 1, wherein the reductant comprises benzoyl formic acid, 4-methoxybenzoyl formic acid or a salt thereof.

8. A system according to claim 1, wherein the salts of the substituted glyoxylic acids are selected from the group consisting of alkali metal, ammonium and substituted ammonium salts.

9. A system according to claim 1, wherein the oxidant and reductant are both aqueous.

10. A system according to claim 1, wherein the reductant is present in an aqueous phase, and the aqueous phase contains from 5 to 15 percent by weight of reductant, based on the total weight of the said aqueous phase.

11. A system according to claim 1, wherein the molar ratio is from 50:50 to 60:40.

* * * * *